United States Patent
Kolvek et al.

(10) Patent No.: US 10,465,739 B2
(45) Date of Patent: Nov. 5, 2019

(54) APPARATUS FOR SECURING AN IMAGE SENSOR WITHIN A NIGHT VISION DEVICE

(71) Applicant: BAE SYSTEMS INFORMATION AND ELECTRONIC SYSTEMS INTEGRATION INC., Nashua, NH (US)

(72) Inventors: Edward M. Kolvek, Merrimac, MA (US); Michael J. Grobecker, Merrimack, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 249 days.

(21) Appl. No.: 15/639,607

(22) Filed: Jun. 30, 2017

(65) Prior Publication Data

US 2019/0003518 A1    Jan. 3, 2019

(51) Int. Cl.
| | |
|---|---|
| F16B 33/04 | (2006.01) |
| F16B 39/24 | (2006.01) |
| H04N 5/225 | (2006.01) |
| F16B 5/02 | (2006.01) |
| F16B 17/00 | (2006.01) |
| F16B 39/284 | (2006.01) |

(52) U.S. Cl.
CPC ............. *F16B 39/24* (2013.01); *F16B 5/025* (2013.01); *H04N 5/2253* (2013.01); *H04N 5/2254* (2013.01); *H04N 5/22521* (2018.08); *F16B 17/006* (2013.01); *F16B 39/284* (2013.01)

(58) Field of Classification Search
CPC ...... F16B 39/24; H04N 5/2254; H04N 5/2241
USPC .................... 411/2, 3, 5, 9, 10, 34, 531–541
See application file for complete search history.

(56) References Cited

U.S. PATENT DOCUMENTS

| | | | | |
|---|---|---|---|---|
| 2,430,737 A | * | 11/1947 | Roe .................. | A47B 91/04 16/39 |
| 2,520,375 A | * | 8/1950 | Roe ................... | B60B 33/0002 16/39 |
| 4,289,060 A | * | 9/1981 | Emmett ............. | F16B 5/0258 411/34 |
| 4,887,948 A | * | 12/1989 | Calmettes .......... | F16B 31/028 411/5 |
| 4,889,457 A | * | 12/1989 | Hageman ........... | F16B 31/028 411/10 |
| 4,979,857 A | * | 12/1990 | Wing ................. | F16B 33/00 411/432 |
| 5,088,866 A | * | 2/1992 | Ischebeck .......... | F16B 31/028 116/212 |
| 5,098,765 A | * | 3/1992 | Bien .................. | B62D 29/048 293/155 |

(Continued)

*Primary Examiner* — Gary W Estremsky
(74) *Attorney, Agent, or Firm* — Anthony P. Ng; Russell Ng PLLC; Scott J. Asmus

(57) ABSTRACT

An apparatus for securing an image sensor within a night vision scope is disclosed. The apparatus includes a flat washer, a crush bushing, and a fastener. The crush bushing is inserted through an opening of a corner anchor of the image sensor. A fastener receptacle is located at a module of the night vision scope. The fastener can be inserted through an opening of the flat washer and a bore of the crush bushing to deform the crush bushing such that the crush bushing material fills any space between the fastener and the fastener receptacle, thereby creating a zero-play connection to restrict any slight movements generated by shocks and vibrations.

10 Claims, 5 Drawing Sheets

(56) References Cited

U.S. PATENT DOCUMENTS

| | | | | |
|---|---|---|---|---|
| 5,683,215 A | * | 11/1997 | Gaignard | F16F 1/3732 |
| | | | | 411/34 |
| 5,865,581 A | * | 2/1999 | Sadri | F16B 31/021 |
| | | | | 411/270 |
| 6,273,655 B1 | * | 8/2001 | McAlpine | F16B 13/0841 |
| | | | | 411/34 |
| 6,540,463 B2 | * | 4/2003 | Ward | F16B 37/042 |
| | | | | 411/173 |
| 2009/0166511 A1 | * | 7/2009 | Kwon | G01J 1/02 |
| | | | | 250/206 |

* cited by examiner

APPARATUS FOR SECURING AN IMAGE SENSOR WITHIN A NIGHT VISION DEVICE

TECHNICAL FIELD

The present disclosure relates to night vision devices in general, and in particular to an apparatus for securing an image sensor within night vision devices.

BACKGROUND

Night vision devices, also known as thermal imaging devices, are optical instruments that allow images to be produced in total darkness. Night vision devices typically include image intensifier tubes and various optics that convert infrared light into viewable images. Night vision devices are commonly used by military personnel for conducting tactical operations in low-light conditions.

Night vision devices can generally be divided into three categories, namely, scopes, goggles and cameras. Night vision scopes, which can be hand-held or mounted on a weapon, are typically monocular having one eye-piece. Night vision goggles, which can be hand-held or worn on the head with a helmet, are typically binoculars having two eye-pieces. Night vision cameras are often permanently mounted on wherever night vision is desired, including buildings and/or properties.

From a mechanical standpoint, night vision scopes designed to be mounted on a weapon have to be able to withstand severe mechanical environments. The securing and maintaining the exact position of an image sensor within a night vision scope under harsh mechanical environments such as shock and vibration associated with repeated weapons fire requires mounting connections having essentially zero play or backlash. Conventionally, this is achieved by using either tightly toleranced parts or permanently bonded joints. In cases where serviceability requirements dictate easy removal and replacement of such elements bonding is not desirable given the inherent difficulty of adhesive removal and the attendant potential for foreign object debris contamination or damage to the host assembly. In such instances, tightly toleranced parts are the only practical alternative. Tightly toleranced parts are relatively expensive and require the acceptance of some small degree of play or backlash that consumes some portion of the available error budget.

The present disclosure provides an improved apparatus for securing an image sensor within night vision scopes.

SUMMARY

In accordance with one embodiment of the present disclosure, an apparatus for securing an image sensor within a night vision scope includes a flat washer, a crush bushing, and a fastener. The crush bushing is inserted through an opening of a corner anchor of the image sensor. A fastener receptacle is located at a module of the night vision scope. The fastener can be inserted through an opening of the flat washer and a bore of the crush bushing to deform the crush bushing such that the crush bushing material fills any space between the fastener and the fastener receptacle, thereby creating a zero-play connection to restrict any slight movements generated by shocks and vibrations.

The features and advantages described herein are not all-inclusive and, in particular, many additional features and advantages will be apparent to one of ordinary skill in the art in view of the drawings, specification and claims. Moreover, it should be noted that the language used in the specification has been selected principally for readability and instructional purposes and not to limit the scope of the inventive subject matter.

BRIEF DESCRIPTION OF THE DRAWINGS

The invention itself, as well as its modes of use, further objects, and advantages thereof, will best be understood by reference to the following detailed description of an illustrative embodiment when read in conjunction with the accompanying drawings, wherein.

DETAILED DESCRIPTION

Figure 1:
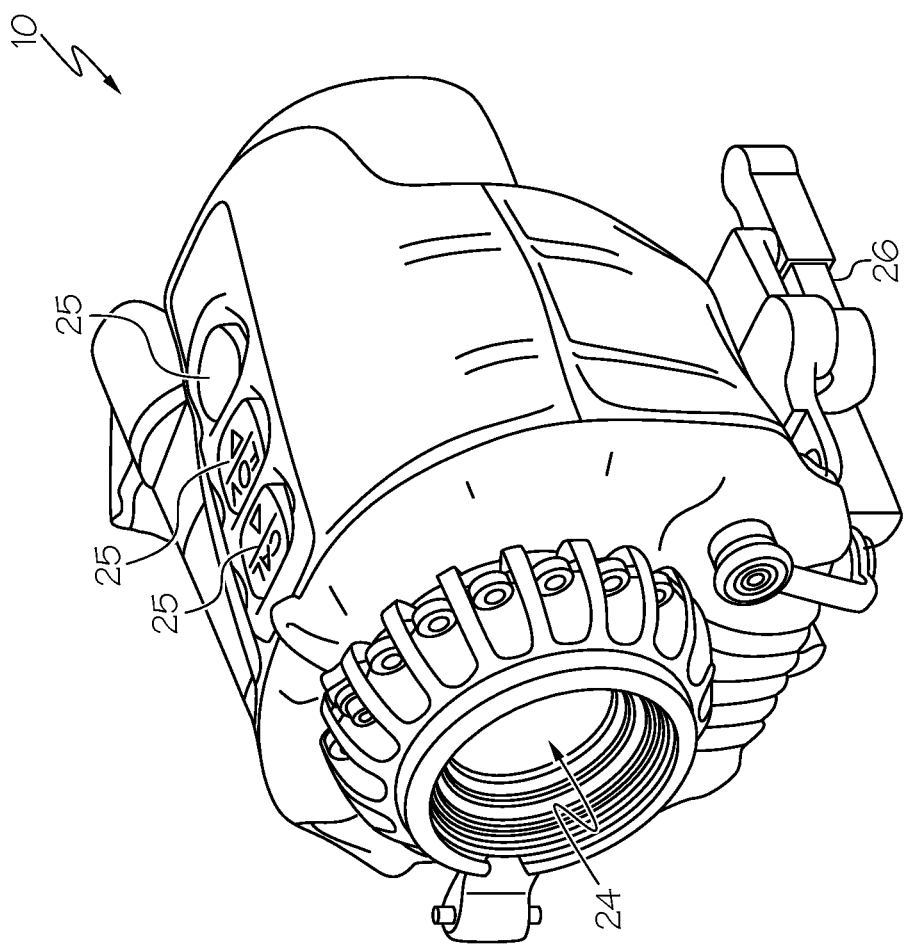
FIG. 1 is an isometric view of a night vision scope, according to one embodiment.

Referring now to the drawings and in particular to FIG. 1, there is illustrated an isometric view of a night vision scope, according to one embodiment. As shown, a night vision scope 10 includes a lens 24, multiple control buttons 25 and a clamping mechanism 26. Lens 24 is for receiving light signals. Control buttons 25 are for controlling various viewing functions, such as field-of-view, focus, etc., of night vision scope 10. Clamping mechanism 26 is for mounting night vision device 10 onto a rail system of a firearm (not shown). Common rail systems include a Picatinny rail system and a Weaver rail system.

Figure 2:
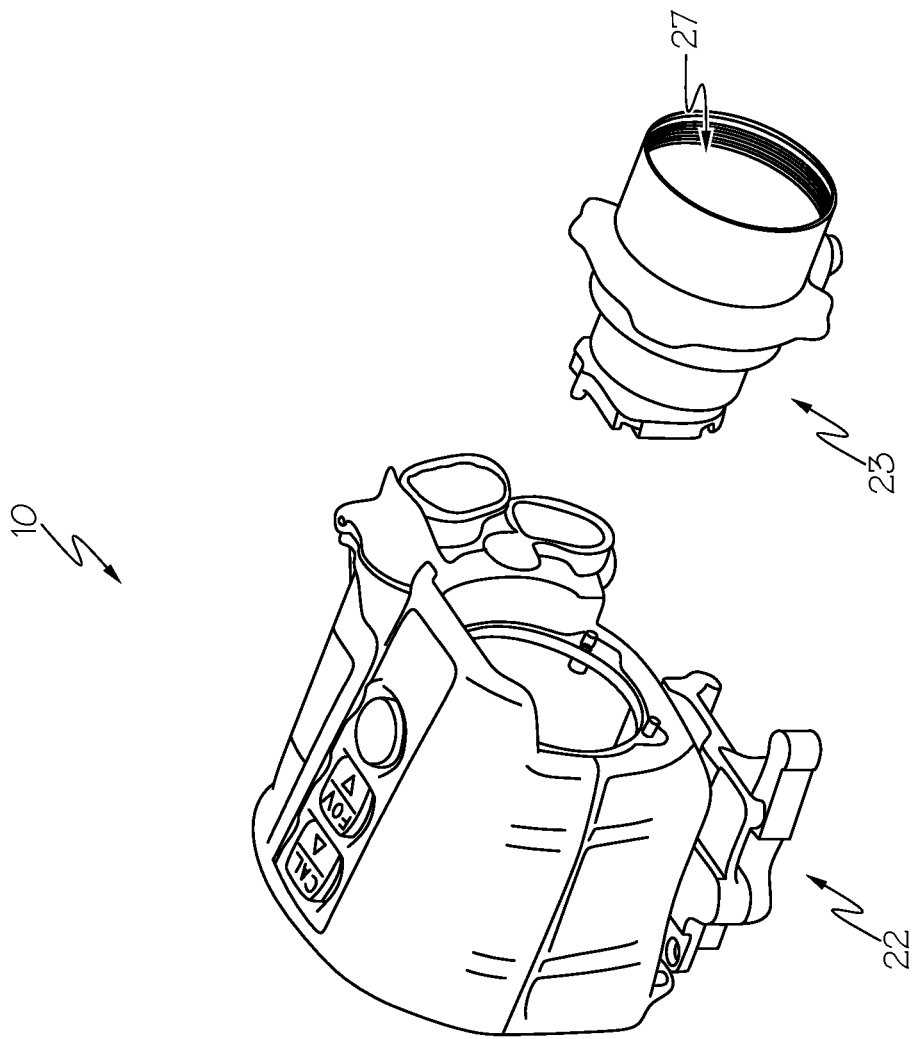
FIG. 2 is an exploded view of the night vision scope from FIG. 1, according to one embodiment.
Figure 2:
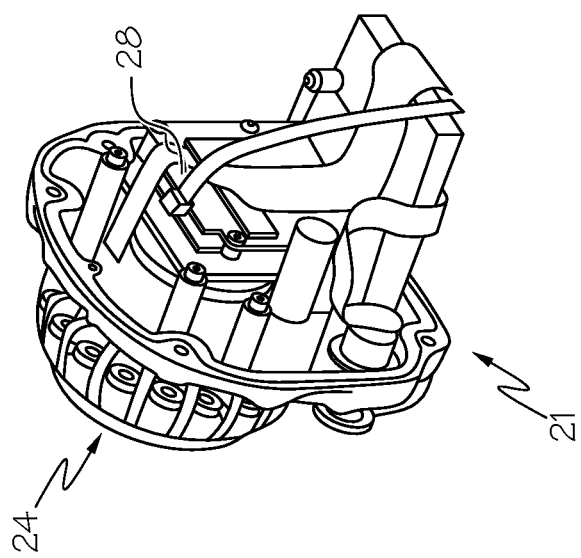

With reference now to FIG. 2, there is illustrated an exploded view of night vision scope 10, according to one embodiment. As shown, night vision scope 10 includes a front-end optical module 21, a control module 22 and a back-end optical module 23. Front-end optical module 21 includes lens 24, an image sensor device 28 and various electronic components. Control buttons 26 for controlling the various electronic components are located on control module 22. Back-end optical module 23 includes an eye piece 27.

Figure 3:
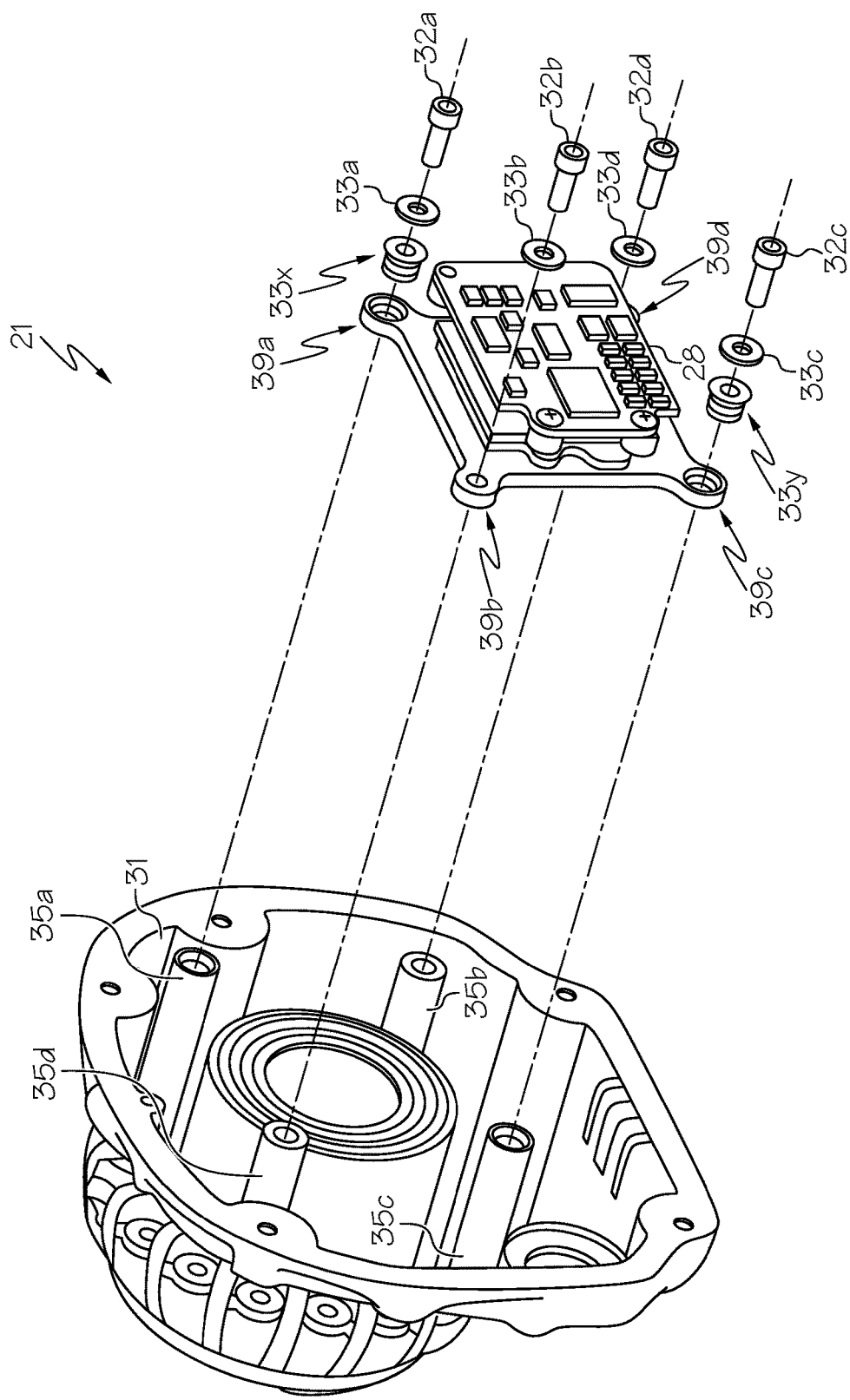
FIG. 3 is an exploded view of a front-end optical module within the night vision scope from FIG. 2, according to one embodiment.

Referring now to FIG. 3, there is illustrated an exploded view of front-end optical module 11, according to one embodiment. As shown, image sensor device 28 is attached to a bracket having corner anchors 39a-39d. Image sensor device 28 can be secured to a chassis 31 of front-end optical module 21 by fasteners such as driving screws 32a-32d through flat washers 33a-33d and corner anchors 39a-39d at fastener receptacles such as screw receptacles 35a-35d, respectively. In addition, a crush bushing 33x is inserted between flat washer 33a at corner anchor 39a. Similarly, a crush bushing 33y is inserted between flat washer 33c at corner anchor 39c located diagonally from corner anchor 39a. Although crush bushings are placed in corner anchors 39a and 39c in the present example, two additional crush bushings can be placed in corner anchors 39b and 39d.

The configurations of corner anchor 39a and corner anchor 39c of image sensor device 28 are substantially identical to each other. Thus, only corner anchor 39a of image sensor device 28 will be further described.

Figure 4B:
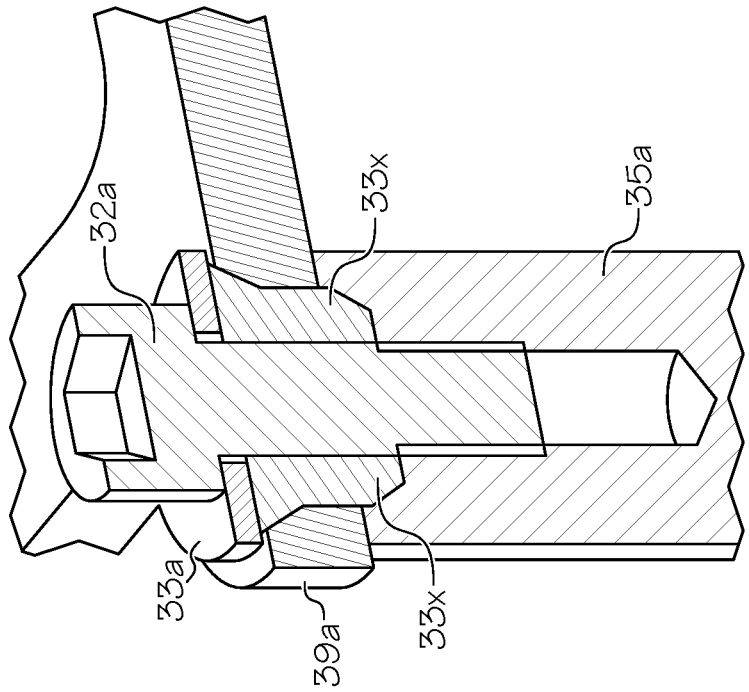
FIGS. 4A-4B are cross-sectional views of a corner anchor for an image sensor device within the front-end optical module from FIG. 3 in a pre-assembled state and an assembled state, respectively.
Figure 4A:
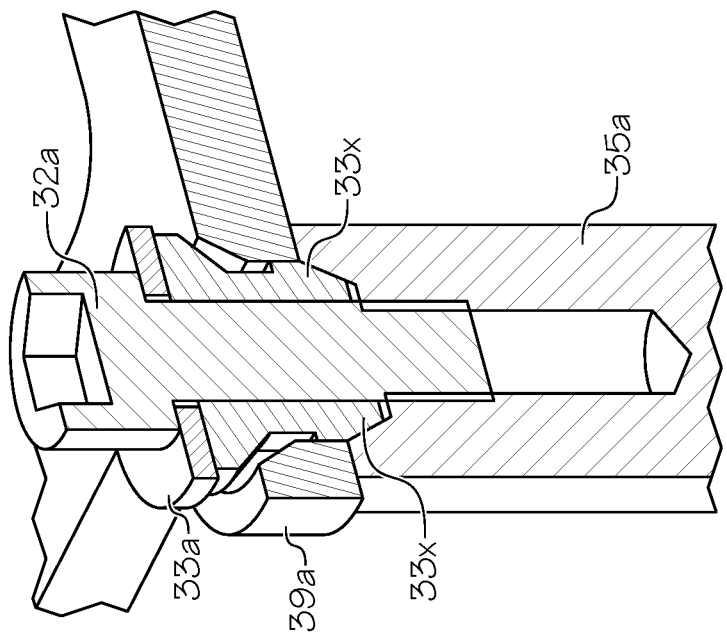

With reference now to FIG. 4A, there is illustrated a cross-sectional view of crush bushing 33x, corner anchor 39a and screw receptacle 35a in a pre-assembled state. Initially, corner anchor 39a of image sensor device 28 is placed on top of screw column 35a located at front-end optical module 21. Before the insertion of screw 32a, crush bushing 33x is inserted into the openings of corner anchor 39a and screw receptacle 35a. Flat washer 33a is then placed on top of crush bushing 33x. Finally, screw 32a is inserted through flat washer 33a, crush bushing 33x and screw receptacle 35a, as shown in FIG. 4A.

Figure 5A:
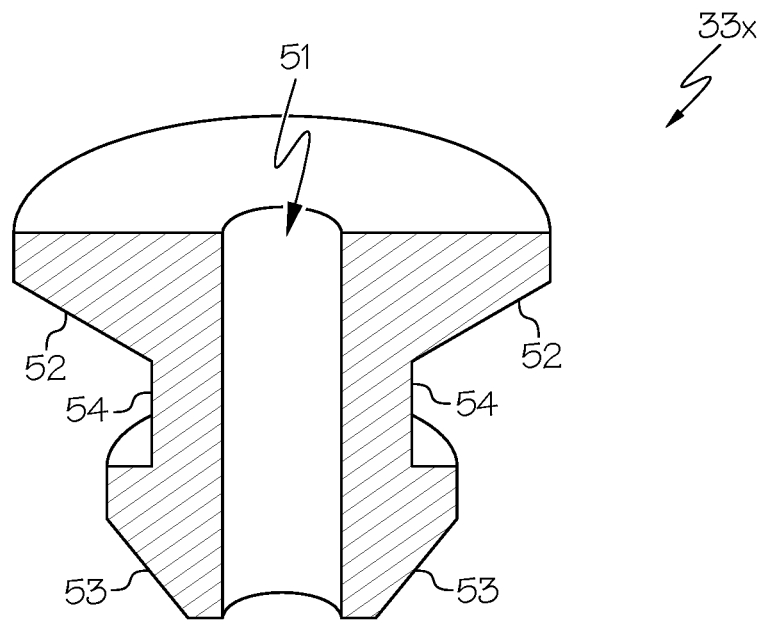
FIGS. 5A-5B are detailed cross-sectional views of two crush bushings.

Referring now to FIG. 5A, there is illustrated a detailed cross-sectional view of crush bushing 33x, in accordance with one embodiment. As shown, crush bushing 33x is substantially cylindrical in shape having a flat head 52, a neck region 54 and a shoulder 53. Shoulder 53 is wider than neck region 54, but flat head 52 is wider than shoulder 53. A central bore 51 goes through flat head 52, neck region 54 and shoulder 53. Central bore 51 allows screw 32a (from FIG. 4A to pass through). The cross-sectional view shows that flat head 52 has a first slanted surface located underneath a first flat surface, shoulder 53 has a second slanted surface located underneath a second flat surface, and neck region 54 has a flat surface located between the first slant surface of flat head 52 and the second flat surface of shoulder 53.

Figure 5B:
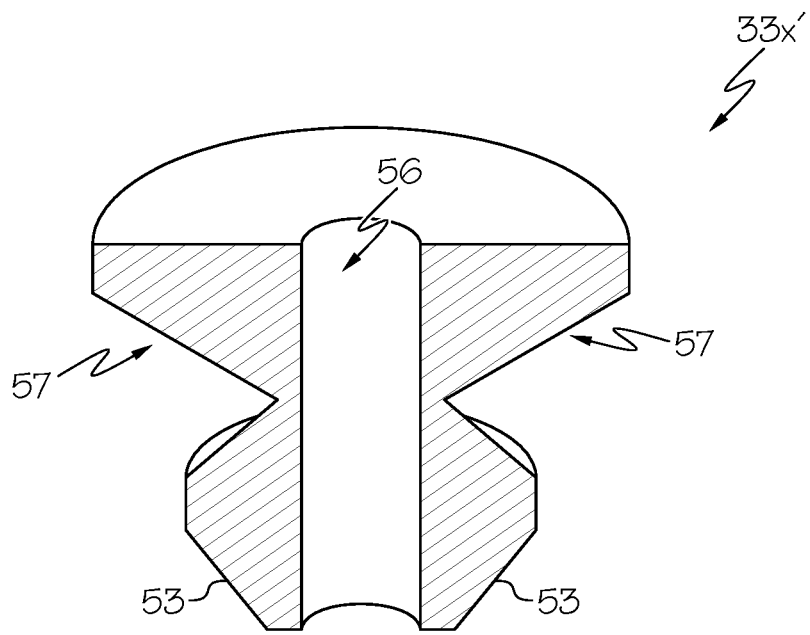

Alternatively, neck region 54 can be eliminated from crush bushing 33x. Referring now to FIG. 5B, there is illustrated a detailed cross-sectional view of crush bushing 33x'. As shown, crush bushing 33x' is substantially cylindrical in shape having a flat head 57 and a shoulder 58. Flat head 57 is wider than shoulder 58. A central bore 56 goes through flat head 57 and shoulder 58. The cross-sectional view shows that flat head 57 has a first slanted surface located underneath a first flat surface, and shoulder 58 has a second slanted surface located above a third slanted surface. The second slanted surface of shoulder 58 is also located adjacent to the first slanted surface of flat head 57.

With reference now to FIG. 4B, there is illustrated a cross-sectional view of crush bushing 33x, corner anchor 39a and screw receptacle 35a in their assembled state. After screw 32 has been tighten within screw receptacle 35a, crush bushing 33x is deformed and eliminates all play among screw 32, corner anchor 39a and screw receptacle 35a. In other words, the plastic deformation of crush bushing 33x material flows and binds any space between screw 32 and any surrounding structure within screw receptacle 35a, thereby creating a zero play connection to restrict any movements generated by shocks and vibrations. As a result, the relative alignment of the optical components are preserved.

Crush bushing 33x can be made of soft aluminum, copper or Eutectic, elastomer, or plastic.

As has been described, the present disclosure provides an improved apparatus for securing an image sensor within night vision scopes.

While the invention has been particularly shown and described with reference to a preferred embodiment, it will be understood by those skilled in the art that various changes in form and detail may be made therein without departing from the spirit and scope of the invention.

What is claimed is:

1. An apparatus for securing an image sensor within a scope, said apparatus comprising:
   a washer;
   a crush bushing inserted through an opening of a structural support of said image sensor;
   a fastener receptacle located at said scope; and
   a fastener for insertion through said flat washer and said crush bushing to secure said corner anchor of said image sensor to said fastener receptacle, wherein said fastener deforms said crush bushing such that material from said crush bushing fills any space between said fastener and any surrounding structure within said fastener receptacle.

2. The apparatus of claim 1, wherein said crush bushing includes
   a flat head having a first dimension;
   a neck region having a second dimension;
   a shoulder having a third dimension larger than said second dimension but smaller than said first dimension; and
   a bore passing through said head, said neck region and said shoulder, wherein said bore is configured to receive said fastener to compress said neck region such that said head contacts said shoulder.

3. The apparatus of claim 1, wherein said crush bushing is made of soft aluminum.

4. The apparatus of claim 1, wherein said crush bushing is made of soft copper.

5. The apparatus of claim 1, wherein said crush bushing is made of Eutectic.

6. The apparatus of claim 1, wherein said crush bushing is made of elastomer.

7. The apparatus of claim 1, wherein said crush bushing is made of plastic.

8. An apparatus for securing a first component to a second component, said apparatus comprising:
   a flat washer;
   a crush bushing inserted through an opening of said first component;
   a fastener receptacle located on said second component; and
   a fastener for insertion through said flat washer and said crush bushing to secure said first component to said second component,
   wherein said fastener deforms said crush bushing such that material from said crush bushing fills any space between said fastener and any surrounding structure of said fastener receptacle, and
   wherein said crush bushing is substantially made of soft aluminum.

9. The apparatus of claim 8, wherein said crush bushing includes
   a flat head having a first dimension;
   a neck region having a second dimension;
   a shoulder having a third dimension larger than said second dimension but smaller than said first dimension; and
   a bore passing through said head, said neck region and said shoulder, wherein said bore is configured to receive said fastener to compress said neck region such that said head contacts said shoulder.

10. An apparatus for securing a first component to a second component, said apparatus comprising:
    a flat washer;
    a crush bushing inserted through an opening of said first component;
    a fastener receptacle located on said second component; and a fastener for insertion through said flat washer and said crush bushing to secure said first component to said second component, wherein said fastener deforms said crush bushing such that material from said crush bushing fills any space between said fastener and any surrounding structure of said fastener receptacle, and wherein said crush bushing is substantially made of soft copper.

\* \* \* \* \*